Patented Jan. 15, 1935

1,988,354

UNITED STATES PATENT OFFICE 1,988,354

ARTIFICIAL MASS AND PROCESS OF MAKING SAME

Herbert Hönel, Klosterneuburg-Weidling, near Vienna, Austria, assignor to Beck, Koller & Company, Inc., Detroit, Mich., a corporation of Delaware No Drawing. Original applications May 11, 1929, Serial No. 362,460, and January 2, 1931, Serial No. 506,296. Divided and this application December 23, 1932, Serial No. 648,724. In Germany May 6, 1928

14 Claims. (Cl. 260—4)

The invention relates to a process for producing organic masses of more or less high molecular weight, which may be employed alone or in combination with filling materials as the basis of pressed articles, as binding agents or for preparing varnishes and other coating or impregnating agents and the like.

The present application is a division of my prior application Serial No. 506,296, filed January 2, 1931, which latter application is a division of an earlier application Serial No. 362,460, filed May 11, 1929, now Patent No. 1,800,296, which in turn is a continuation in part of my application Serial No. 218,587, filed Sept. 9, 1927, now Patent No. 1,800,295.

The process consists in heating condensation products of low molecular weight, obtained with the aid of alkaline contact agents from such phenolic substances, which possess only two particularly reactive positions in the molecule and which, when heated alone change into an infusible condition, to elevated temperatures together with any ester-like chemical substances. The reaction is accompanied with the formation of water and is to be regarded as a condensation reaction.

The present application relates more particularly to reacting those condensation products with mixed esters such as are obtained by esterifying carboxylic acids (polybasic or both polybasic and monobasic) on the one hand with both polyhydric and monohydric alcohols on the other.

As the particularly reactive positions in a phenol are to be regarded, as is known, the two ortho and the para positions to the phenolhydroxyl. One of these positions must therefore be occupied by a substituent. Examples of the latter are, a hydrocarbon radical (alkyl, aryl, aralkyl, hydroaromatic radical) or an oxalkyl radical or chlorine. Other substituents have proved to be less suitable. One or both of the meta positions may on occasion also be occupied. The following are examples of a few easily obtainable phenolic bodies of this kind: o- and p-cresol, certain xylenols, carvacrol, thymol, p-tertiary butyl phenol and amyl phenol, p-benzyl phenol, as well as the corresponding derivatives of m-cresol, guaiacol, o- and p-chlorophenol, o- and p-chloro-m-cresol, etc.

Derivatives of the dioxybenzenes, i. e. divalent mononucleur phenolic substances, are also suitable; the conditions, however, are somewhat more complicated and not quite clear. As, moreover, the use of these substances is lacking in economy they will not be further discussed.

On the other hand, the applicability of all those di-valent, di-nucleur phenolic substances, which are derivatives of the pp-di-oxy-diphenylmethane, is to be emphasized. They are easily obtainable and result from the condensation of 2 mols of phenols or certain homologues with 1 mol of a carbonyl compound with the aid of hydrochloric acid, or, if possible, other acids. In the present case, the most suitable phenol homologue is o-cresol, from which di-o-cresylol methane, ethane, propane, or butane, is obtained according to whether condensation has been effected with formaldehyde and its homologues or acetone and its homologues. Cyclic ketones may also be employed, in which case, for example, di-o-cresylol cyclohexane or di-o-cresylol methyl-cyclohexane corresponding to the above compounds, are obtained. Phenol, however, may also be used as starting material, and, for example, 2 atoms of chlorine be introduced as substituents, in the di-phenylol compounds thus obtained. In all these cases di-nucleur di-valent phenolic substances are obtained, all of which also only possess two reactive positions in the molecule.

It is to be observed that condensation products from phenolic substances with only one reactive position in the molecule may also be employed. The product resulting from the reaction of such substances with the neutral ester-like bodies is rather poor in quality and the yield is rather limited, which is in agreement with the fact that, when heated alone, they cannot be converted into the infusible state. Phenols of this kind are, for example, certain xylenols, pseudo-cumenol, creosol, chlor-o-cresol and chlor-p-cresol.

α- and β-naphtol behave in a surprising manner like the last mentioned phenols, although they actually belong to the first mentioned group.

My invention more particularly consits in that where a substantially neutral ester-like body is reacted with a condensation product of the heat-hardening type and of low molecular weight obtained by alkaline condensation from an excess of formaldehyde and a phenolic body, which phenolic body has only two unsubstituted particularly reactive positions, a smooth reaction mass may be obtained, as contrasted with a lumpy mass containing insoluble and infusible particles, such as would result where condensation products of the heat-hardening type are employed, derived from phenols having all three particularly reactive positions unsubstituted.

The mechanism of the reaction very probably is that the molecules of the condensation product do not only react with one another leading to the formation of products of very high molecular weight, but also with the ester-like substance or with its components. The alcoholic hydroxyl groups of the condensation product, known as very reactive, may bring about unions so that multivalent ester components may be in part formed. This possibility in conjunction with the first mentioned reaction may lead to the formation of individual gelatinous or rubber-like infusible and insoluble but nevertheless homogeneous masses. Such products are also to be considered as being of infinitely high viscosity. When employing smaller proportions of the condensation product a still soluble end product may be obtained which, however, also is distinguished by an essentially higher viscosity as compared with the reaction mixture before entering the reaction, or with any of the two components.

In general all possible ester-like substances have proved to be applicable to the reaction. Even low molecular completely crystalloid esters, for example benzoic acid esters of monovalent alcohols, yield according to the proportions employed, thin to highly viscous oils or gelatinous masses. Esters of monovalent alcohols with polyvalent components may yield, even with lesser quantities of the same condensation product, gelatinous end products. The full value of the process, however, is only reached when the ester-like substance is one which is practically non-volatile. Thus products which have been obtained by esterification of a suitable mixture or both polyvalent and monovalent ester-forming components are very advantageous in this sense. Also such esters are well adapted which are obtained from a polyvalent ester-forming component on the one hand (e. g. a polybasic acid) and a mixture of poly- and monovalent components on the other side (e. g. a mixture of poly- and monohydric alcohols).

In order better to understand this, the well-known fact may be mentioned that the esterification of equivalent proportions of polybasic acids and polyhydric alcohols in most cases finally leads to insoluble and infusible masses. But when a sufficient proportion of a monovalent ester-forming component is employed simultaneously, the ester-like substance obtained is soluble and far from a rubber-like infusible condition. With such esters even small quantities of a condensation product produce the above described effect.

The final end product obtained according to this process with a suitable proportion of a condensation product, shows very similar external properties to those of a mere ester obtained with a comparatively high proportion of the usually expensive polybasic acids, i. e. it is still soluble but has a high viscosity and a certain rubber-like elasticity. The economic advantage of the process which enables the proportions of polyvalent ester components to be replaced to a very considerable extent by the usually cheap monobasic acid is thus very evident, the more so as at the same time a considerable saving in polyvalent alcohol is also effected. Furthermore, such products obtained according to this process have been found to be technically superior to merely ester-like products or products otherwise equivalent as to viscosity conditions due to their better waterproofness and generally greater resistance to chemical influences.

It is, moreover, not necessary to start with the individual components of the esters as such; it is also possible to replace the monobasic acids (for example higher fatty acids etc.) wholly or in part by their glycerides (i. e. fat or fatty oil), in which case individual esters are nevertheless obtained apparently owing to re-esterification. Purely physical mixtures of complicated esters of this kind and ordinary fatty acid glycerides, etc., may of course also be subjected together to the reaction with the condensation products. In such cases as these the economic advantage is, of course still greater.

The monobasic as well as the polybasic acids may be aliphatic, saturated or unsaturated, aromatic or hydroaromatic, they may or may not contain alcoholic or phenolic hydroxyl groups (i. e. they may or may not be oxy acids). Glycerine is the most important example of a polyvalent alcohol; alcohols of higher valency or the only divalent glycol may, however, also be employed.

Finally it should be again emphasized that esters of every kind may be employed for the reaction. The hydroxyl compound may also be a phenol and the acid an inorganic acid. A condition for the success of the reaction is merely that the condensation product is soluble in the ester-like substance (at least when hot) before a condensation reaction takes place, as otherwise, of course, no mutual reaction can result. This result is obtained by suitably choosing the substituents in the phenolic substance. It may in some cases be convenient for instance if the ester-like compound is per se a resin-like substance of high melting point to carry out the process in the presence of a suitable solvent; the latter may, if required, be removed by distillation when the reaction is over.

The preparation of the condensation products is effected in known manner, preferably by leaving the phenolic substance or a mixture of several phenols and aqueous formaldehyde together, with at least so much alkali hydroxide, that a clear solution results, if necesasry with the aid of alcohol, to react for a long time at room temperature or slightly elevated temperature. The resulting reaction product is then precipitated with acid-reacting agents. Formaldehyde in excess of the equimolecular quantity is to be employed for successfully carrying out the further reaction with the ester-like products.

This reaction may be effected in different ways. The quantity of condensation product employed may be such that, if the condensation reaction with the ester were carried to completion an insoluble, rubber-like product would result, in which case the reaction must be interrupted before completion, if necessary even in its initial stage. In this case the solutions of the resulting products yield coatings, which become particularly hard at furnace temperatures. If necessary, driers may also be added to the reaction product. Products of this kind resulting from an interrupted reaction are also particularly suitable for use as plastic masses. They may be employed with or without filling materials for the preparation of various commodities.

An alternative procedure is to employ the condensation product in such a quantity that even on complete condensation with the ester-like product a viscous or resin-like, occasionally a wax-like end product is obtained, which more or less approaches the rubber-like condition without actually attaining it. An increase in the colloidal condition, such as in viscosity, is at least effected. In the case of solid, resin-like esters, an increase of their melting point is, as a rule, effected as well. The heating of the product can in this case be carried to about 200–220° C. for any desired time without any noteworthy further increase of the colloidal condition being observed. The still soluble products or their solutions may be employed alone as the basis for paints or, in general, as raw materials for the production of varnishes and other coating masses. If the acid components or one of these components is derived from drying or semi-drying oils a drier may also be added, and in this way tough and hard drying varnishes may be obtained.

In individual cases very special effects may also be obtained by means of the process. Thus, for example, wood oil, even when condensed with only a small quantity of a suitable condensation product, loses its known disadvantageous manner of drying. A particularly hard, smooth and rapidly drying varnish may in fact be obtained in this way.

The invention will be more clearly understood by reference to the following examples, which, however, are intended as illustrative only, rather than as restrictive.

EXAMPLES

*Example 1*

6 parts of melissic palmitate (bees wax) are melted and stirred up with the liquid condensation product obtained from one part of p-tertiary-amyl phenol and one part of 30% formaldehyde. The temperature is then gradually raised to 240° C. The brown end product shows characteristic properties which differ from those of the bees wax itself. It is harder, more easily polished, more plastic and in thin layers more transparent, and when poured out in thin plates is elastically pliable. When poured onto a smooth surface it displays considerable adhesive powers. In general the colloidal properties of the product are considerably increased, and the product itself to a certain extent assumes resin-like properties.

*Example 2*

4 parts of melted beef tallow are stirred up with the viscous condensation product resulting from 1 part of p-tertiary-butyl-m-cresol and 1 part of formaldehyde 40% by volume gradually heated up to 190° C. and maintained for 1–1½ hours at this temperature. The end product has the character of a very viscous oil and only sets when cooled with ice to a lard-like mass.

*Example 3*

100 grms. of castor oil and the crystalline condensation product obtained from 40 grms. of p-cresol and 60 grms. of 30% formaldehyde are heated with stirring up to 180° C. and maintained at this temperature until a cooled sample shows rubber-like elastic properties. The product is soluble in benzene and benzene-alcohol mixtures, as well as in various other solvents, but not in alcohol alone. When mixed with a siccative a varnish is obtained which on drying becomes considerably hard. The product may also be added as a softener to other siccative-free varnishes.

*Example 4*

The thick oily condensation product obtained with the aid of alkali from 1 part of p-tertiary-butyl-phenol and 1 part of 30% formaldehyde by heating for 24 hours to 50–55° C. and precipitated with acids is introduced at about 130° C. into 10 parts of wood oil with stirring. The temperature is then gradually raised to 220° C. The end product has the viscosity of a castor oil and yields with a suitable quantity of siccative and on suitable dilution a varnish of excellent properties which dries clear extremely rapidly.

*Example 5*

A viscous condensation product obtained with the aid of alkali from 30 grms. of thymol and 40 grms. of 30% formaldehyde is introduced into and dissolved in 500 grms. of a moderately boiled mixture of wood oil and linseed oil. This mixture, so-called "honey-oil", is prepared in the usual manner by heating a mixture of 1 part of wood oil and 3 parts of linseed oil for 4 hours at 280° C. It is to be regarded as the mixed glycerine ester of monobasic olefine carboxylic acids and polybasic olefine carboxylic acids obtained by partial polymerization. The temperature is gradually raised whilst stirring. After expelling the mechanically combined water the reaction mixture is clear even when cold. It is finally heated up to 220° C. The product is still soluble and when cold represents a sticky and very ropy mass. On adding a siccative a fairly hard and tough drying varnish is obtained.

*Example 5a*

The quantity of honey-oil in the foregoing example is diminished to 300 grms. and the reaction mixture only heated to 160° C.

The highly viscous oil, when suitably diluted, yields a coating agent (binding agent, impregnating agent, etc.), which even without the addition of a siccative or without absorbing oxygen from the air yields on heating to 160–200° C. a tenaciously adhesive coat etc. For this process 1 hour to 10 minutes are required according to the temperature employed. With the addition of siccatives a coat of pre-eminent hardness and resisting power is obtained at this temperature.

*Example 6*

A condensation product of low molecular weight obtained from 70 grms. of o-cresol and 100 grms. of 30% formaldehyde is dissolved with heating in 200 grms. of tricresyl phosphate and the mixture heated to 160° C. until a sample on cooling shows a highly viscous ropy oil. It is soluble in benzene hydrocarbons and other solvents. It may be employed, for example, as the basis for furnace-drying varnishes. On continued heating of 160° C. or higher a rubber-like to wood oil gelatinous mass is obtained.

*Example 7*

100 grms. of succinic acid, 150 grms. of lactic acid (100%) and 120 grms. of glycerine (98%) are heated to 160–200° C. until a soft resin-like product with an acid number of about 25 is obtained. At about 100–120° C. the crystalline condensation product obtained from 30 grms. of p-chlorophenol and 35 grms. of 30% formaldehyde is introduced and soon goes into solution. The temperature is gradually raised to 220° C. A soft resin having rubber-like elastic properties which is completely soluble in acetone and alcohol-benzene mixtures is obtained.

*Example 8*

A condensation product resulting from 55 grms. of p-chlor-m-cresol and 55 grms. of formaldehyde (40% by volume) is added with heating to the fairly hard and brittle resin-like esterification product prepared as in Example 7 from 100 grms. of succinic acid, 160 grms. of salicylic acid and 100 grms. of glycerine and the mixture caused to react by raising the temperature to about 200° C. Without an apparent increase in the melting point of the resin-like product being observed a resin of marked shellac-like properties is obtained. The resin-like condition in this case is without doubt very considerably increased. The product is soluble in acetone and other solvents and may be employed for preparing polishes and the like. Its solutions may further be mixed with both nitrocellulose and with acetylcellulose varnishes. In both cases clear, satisfactorily adhering films are obtained.

*Example 9*

The ester-like semi-liquid reaction product obtained from 150 grms. of citric acid (crystalline), 100 grms. of ricinoleic acid, 100 grms. of salicylic acid and 115 grms. of glycerine on the one hand and 45 grms. of p-cresol di-alcohol on the other hand are caused to react together at about 180° C. A soft, very tenaciously elastic pale resin is obtained, which is soluble in alcohol up to the proportion of 1:1, but soluble in benzene-alcohol mixtures, in acetone, as well as in ester-like solvents in any proportion. It is especially suitable as addition to nitro-cellulose varnishes.

*Example 10*

The condensation product obtained as in Example 6 is condensed with the thick oily ester obtained from 100 grms. of phthalic anhydride, 100 grms. of oleic acid and 65 grms. of ethylene glycol. A soft, rubber-like, elastic resin is obtained, which is soluble in benzene hydrocarbons as well as other solvents and is very suitable as an addition to nitrocellulose varnishes.

*Example 11*

The condensation product resulting from 3 parts of xylenol (1:4:5) and 4 parts of 30% formaldehyde is added to an ester having an acid number of 30 and obtained from 6 parts of d-tartaric acid, 4 parts of benzoic acid and 4 parts of ethylene glycol. A soft soluble resin, which is elastic like rubber, is obtained as in Example 10.

*Example 12*

4 parts of phthalic anhydride, 6 parts stearic acid and 3 parts of glycerine are esterified together at 180–220° C. until an acid number of about 20 is reached. The product rapidly sets at room temperature to a cloudy wax-like mass, which is somewhat sticky to the touch. The wax-like character is also manifested in its solutions, which, when poured out in thin layers, allow the solvent to evaporate very slowly.

100 grms. of o-cresol and 20 grms. of methyl-ethyl-ketone are condensed with the aid of concentrated hydrochloric acid (37%). The reaction product is a mixture of o-cresol and di-o-cresylol-butane. It is condensed at room temperature with 100 grms. of formaldehyde (40% by volume) with the aid of caustic soda and the condensation product precipitated with acid after about two weeks.

300 grms. of the ester-like product and half of the condensation product obtained above are heated together to 230° C. The resulting product represents at about 35° C. a soft elastic resin-like transparent mass. Even on cooling to room temperature it is first clear and elastically flexible. After a few hours it merely becomes translucent and is then fairly brittle and easily friable. It is soluble in benzene hydrocarbons. Its solutions, when poured out in thin layers, allow the solvent easily to evaporate. The layer of product which remains is first clear, but after some time becomes cloudy like wax and possesses to a high degree the power of repelling water.

*Example 13*

220 grms. of the ester-like product obtained as in example 12 are heated to 150° C. with the remaining half of the condensation product obtained in the same example, until a cooled sample shows properties similar to those of the end product obtained as in Example 12. The product like the latter is soluble in benzene and the like. The solutions yield a temporarily clear film, which may be hardened at 150–200° C. and which adheres well to the coated surface, possesses strong water-repelling powers and remains permanently clear. The product itself, mixed with filling agents of any kind, may be employed for preparing compressed substances.

*Example 14*

The ester of acid number 10 obtained from 50 grms. of sebacic acid, 100 grms. of technical abietic acid and 30 grms. of glycerine and which represents a soft sticky resinous mass, is worked up in the usual manner with the crystalline oily condensation product obtained from 13 grms. of guaiacol and 18 grms. of 30% formaldehyde. A resin somewhat softer than shellac is obtained, which, at the temperature of its melting point, is elastic like rubber. It is soluble in benzene hydrocarbons, acetone, etc., and miscible to a clear solution with nitrocellulose in any proportion.

*Example 15*

2 parts of o-cresol and 1 part of technical methyl-cyclohexanone are condensed with the aid of hydrochloric acid. The reaction product consists of three isomers of di-o-cresylol-methyl-cyclohexane

$$CH_3.C_6H_9 = (CH_3.C_6H_3OH)_2$$

and represents a thick oily mass permeated with separated crystals. It is condensed by means of caustic alkali at room temperature with 2 parts of formaldehyde (40% by volume) and the thick oily condensation product then separated with acids.

The latter is worked up with 15 parts of an ester obtained from 100 grms. of camphoric acid, 250 grms. of abietic acid and 65 grms. of glycerine and which represents a fairly brittle resin with an acid number of 20 and a melting point of 75–85° C. On condensing the latter with the condensation product, a very hard resin melting about 30° C. higher is obtained.

By relatively increasing the condensation product a resin can be readily obtained, which is extremely hard and at the temperature of its melting point represents a rubber-like elastic mass. It is soluble in benzene hydrocarbons and yields clear films when mixed with nitrocellulose.

Example 16

(a). 76 grms. of benzyl chloride are slowly added with gentle heating at the start to 108 grms. of technical m-cresol containing 60% of pure m-cresol. In the simultaneous presence of a catalyst consisting of about 5 grms. of dry zinc chloride the reaction starts fairly quietly and may, if necessary, be later assisted and brought to completion by again heating. The benzyl group merely enters the m-cresol as a substituent with the removal of HCl, most probably in the para position, possibly also in the ortho position. According to the work of Beilstein, the position of the benzyl group is not known. The p-cresol apparently remains untouched. The oily reaction product is repeatedly washed with hydrochloric acid-containing water and then 180 grms. of 30% formaldehyde added together with so much caustic alkali that after shaking clear solution results. After about two weeks the condensation product is precipitated.

(b). 250 grms. of alcohol-soluble manila are melted at 230-240° C. with 1000 grms. of colophony, and, if necessary, the melt freed from dirt particles by filtration through a fine sieve. The mixture is then esterified at a temperature of 240-280° C. with 150 grms. of glycerine (sp. g. 1.23).

Manila copal contains polybasic resin acids.

The condensation product is gradually introduced at 170° C. into this mixed ester and the temperature then raised to 250° C. The end product is hard and tough and readily soluble in drying oils.

Example 17

The thick oily esterification product obtained from 4 parts of phthalic anhydride, 6 parts of linoleic acid, 2 parts of colophony and 3 parts of glycerine are heated to 150° C. with the condensation product obtained from 2 parts of butyl phenol and 2 parts of 30% formaldehyde until a sample when cold represents a soft rubber-like elastic mass. The product is not only soluble in benzene hydrocarbons, but also in oil of turpentine and mineral spirits and yields, with or without the addition of siccatives, a varnish which dries very hard at furnace temperature.

4-5 parts of linoleic acid employed for the above ester may be replaced by linseed oil. It only takes considerably longer until a uniformly clear reaction mass is formed.

Example 18

The thick oily esterification product having an acid number of 30 obtained from 50 grms. of phthalic anhydride, 150 grms. of ricinoleic acid and 50 grms. of mannite, is condensed at 180° C. with the crystalline condensation product obtained from 30 grms. of a mixture of o- and p-chlor-m-cresol and 30 grms. of formaldehyde (40% by volume). The mixture of phenolic substances is obtained by chlorinating the m-cresol dissolved in glacial acetic acid with the calculated quantity of elementary chlorine with ice cooling, and consist mainly of the para compound.

The end product is very soft and elastic like rubber, it may be diluted to a limited extent with alcohol, in any proportion with benzene hydrocarbons and ester-like solvents, and may be employed as an addition for nitrocelluose varnishes. With the addition of siccatives it yields a hard drying varnish.

Example 19

The soft sticky esterification product obtained from 100 grms. of phthalic anhydride, 100 grms. of methyl cyclohexanol and 30 grms. of glycerine is heated to 140-200° C. together with a condensation product resulting from 50 grms. of di-chlor-di-phenylol-propane and 60 grms. of 30% formaldehyde. A resin-like product, somewhat softer than shellac, results, which, like the latter has rubber-like elastic properties at the temperature of its melting point. It can with advantage be employed as a resin for nitrocellulose varnishes.

Example 20

105 grms. of crystallized citric acid, 200 grms. of benzyl alcohol are heated together in a distillation flask until a temperature of 250° C. is reached. The benzyl alcohol distilled over with the water of crystallization and reaction is separated therefrom, re-introduced into the flask, the above described operation being then repeated. Finally the unchanged benzyl alcohol is removed by applying a vacuum. The reaction product, which remains in the flask, amounts to about 135 grms. and has an acid number of 90-100; about 25 grms. of water are collected in the receiver. That means that one carboxylic group has been esterified and partial formation of anhydride has taken place. 50 grms. of oleic acid and 42 grms. of glycerine are now added and the whole is heated to 250° C. until an acid number of 10 is reached. The light brown product is a thick liquid having the consistency of a thick boiled linseed oil.

The condensation product obtained as described in Example 18 is incorporated at a temperature below 140° C., the temperature being then gradually raised up to 220° C. The final product is a resin, which is soft at ordinary temperature, of rubber-like elasticity, soluble in benzene hydrocarbons, ester-like solvents and so on, and may be added to nitrocellulose varnishes in any desired proportion.

In the following claims the expression "soluble artificial masses" is intended to designate bases for coatings of all kinds, particularly varnishes, and bases for impregnating agents, binders and for all sorts of commodities.

The acids and their anhydrides are to be considered as equivalent in forming the esters.

What I claim is:

1. A process of producing soluble artificial resinous masses which comprises reacting together (1) an excess of a product obtained by esterifying carboxylic acids with both monohydric and polyhydric alcohols and (2) a neutralized condensation product obtained with the aid of an alkaline catalyst from formaldehyde in excess of the equimolecular proportion and a phenol having only two unsubstituted particularly reactive positions in the molecule, the condensation product being capable of undergoing substantial further condensation when heated.

2. A soluble artificial resinous mass produced by reacting together (1) an excess of a product obtained by esterifying carboxylic acids with both monohydric and polyhydric alcohols and (2) a neutralized condensation product obtained with the aid of an alkaline catalyst from formaldehyde in excess of the equimolecular proportion and a phenol having only two unsubstituted particularly reactive positions in the molecule, the condensation product being capable of undergoing substantial further condensation when heated.

3. A process of producing soluble artificial resinous masses which comprises reacting together (1) the product obtained by esterifying polybasic carboxylic acids with both monohydric and polyhydric alcohols and (2) a neutralized condensation product obtained with the aid of an alkaline catalyst from formaldehyde in excess of the equimolecular proportion and a phenol having only two unsubstituted particularly reactive positions in the molecule, the condensation product being capable of undergoing substantial further condensation when heated.

4. A soluble resinous mass produced by reacting together (1) the product obtained by esterifying polybasic carboxylic acids with both monohydric and polyhydric alcohols and (2) a neutralized condensation product obtained with the aid of an alkaline catalyst from formaldehyde in excess of the equimolecular proportion and a phenol having only two unsubstituted particularly reactive positions in the molecule, the condensation product being capable of undergoing substantial further condensation when heated.

5. A process of producing artificial soluble resinous masses which comprises reacting together (1) in excess of a product obtained by esterifying phthalic anhydride with both monohydric and polyhydric alcohols and (2) a neutralized condensation product obtained with the aid of an alkaline catalyst from formaldehyde in excess of the equimolecular proportion and a phenol having only two unsubstituted particularly reactive positions in the molecule, the condensation product being capable of undergoing substantial further condensation when heated.

6. A soluble resinous mass produced by reacting together (1) an excess of a product obtained by esterifying phthalic anhydride with both monohydric and polyhydric alcohols and (2) a neutralized condensation product obtained with the aid of an alkaline catalyst from formaldehyde in excess of the equimolecular proportion and a phenol having only two unsubstituted particularly reactive positions in the molecule, the condensation product being capable of undergoing substantial further condensation when heated.

7. A process according to claim 1 in which the phenol is a derivative of the binuclear divalent dihydroxy-diphenyl-methane and has only two unsubstituted particularly reactive positions while the other two such positions are substituted by chlorine.

8. A soluble resinous mass according to claim 2 in which the phenol is a derivative of the binuclear divalent dihydroxy-diphenyl-methane and has only two unsubstituted particularly reactive positions while the other two such positions are substituted by chlorine.

9. A process of producing soluble artificial resinous masses which comprises reacting together (1) the product obtained by esterifying phthalic anhydride with both methyl cyclohexanol and glycerine and (2) a neutralized condensation product obtained with the aid of an alkaline catalyst from formaldehyde in excess of the equimolecular proportion and di-chlor-diphenylol propane, the condensation product being capable of undergoing substantial further condensation when heated.

10. A soluble resinous mass produced by reacting together (1) the product obtained by esterifying phthalic anhydride with both methyl cyclohexanol and glycerine and (2) a neutralized condensation product obtained with the aid of an alkaline catalyst from formaldehyde in excess of the equimolecular proportion and di-chlor-diphenylol propane, the condensation product being capable of undergoing substantial further condensation when heated.

11. A process of producing soluble artificial resinous masses which comprises reacting together (1) an excess of a product obtained by esterifying both polybasic and monobasic carboxylic acids on the one side with both polyhydric and monohydric alcohols on the other side and (2) a neutralized condensation product obtained with the aid of an alkaline catalyst from formaldehyde in excess of the equimolecular proportion and a phenol having only two unsubstituted particularly reactive positions in the molecule, the condensation product being capable of undergoing substantial further condensation when heated.

12. A soluble resinous mass produced by reacting together (1) the product obtained by esterifying polybasic carboxylic acids with both monohydric and polyhydric alcohols and (2) a neutralized condensation product obtained with the aid of an alkaline catalyst from formaldehyde in excess of the equimolecular proportion and a phenol having only two particularly reactive positions in the molecule, the condensation product being capable of undergoing substantial further condensation when heated.

13. A process of producing soluble artificial resinous masses which comprises reacting together (1) an excess of a mixed ester obtained from citric and oleic acid on the one side and glycerine and benzylalcohol on the other side, and (2) a neutralized condensation product obtained with the aid of an alkaline catalyst from formaldehyde in excess of the equimolecular proportion and a mixture of o- and p- chlor m-cresol, the condensation product being capable of undergoing substantial further condensation when heated.

14. A soluble resinous mass produced by reacting together (1) an excess of a mixed ester obtained from citric and oleic acid on the one side and glycerine and benzyl alcohol on the other side, and (2) a neutralized condensation product obtained with the aid of an alkaline catalyst from formaldehyde in excess of the equimolecular proportion and a mixture of o- and p-chlor m-cresol, the condensation product being capable of undergoing substantial further condensation when heated.

HERBERT HÖNEL.